United States Patent
Armstrong et al.

(10) Patent No.: US 9,829,034 B2
(45) Date of Patent: Nov. 28, 2017

(54) CABLE RETENTION CLIP

(71) Applicants: Rodney Armstrong, Gastonia, NC (US); James Kull, Denver, NC (US); Patrick Hartman, Belmont, NC (US)

(72) Inventors: Rodney Armstrong, Gastonia, NC (US); James Kull, Denver, NC (US); Patrick Hartman, Belmont, NC (US)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 15/004,190

(22) Filed: Jan. 22, 2016

(65) Prior Publication Data
US 2017/0211610 A1 Jul. 27, 2017

(51) Int. Cl.
*A44B 11/25* (2006.01)
*F16C 1/10* (2006.01)
*F16L 3/02* (2006.01)
*F16F 9/46* (2006.01)
*F16F 9/19* (2006.01)

(52) U.S. Cl.
CPC .............. *F16C 1/105* (2013.01); *F16F 9/461* (2013.01); *F16L 3/02* (2013.01); *F16F 9/19* (2013.01); *F16F 2226/04* (2013.01)

(58) Field of Classification Search
CPC ... H02G 3/30; H02G 3/263; F16L 3/08; F16L 3/1203; F16L 3/1041; F16B 2/20; A44B 11/25

USPC ............ 267/64.12; 188/300; 248/74.1–74.4, 248/161, 301, 404, 316.7; 24/335, 339

See application file for complete search history.

(56) References Cited

U.S. PATENT DOCUMENTS

| | | | | |
|---|---|---|---|---|
| 2,088,890 A | * | 8/1937 | Winby | E04G 7/14 24/335 |
| 2,160,392 A | * | 5/1939 | Schade | B43K 23/001 211/69 |
| 3,107,076 A | * | 10/1963 | Rosselet | F16L 3/1083 24/339 |
| 4,889,006 A | * | 12/1989 | Kolinske | F16B 21/20 123/400 |
| 5,411,228 A | * | 5/1995 | Morawa | F16L 3/04 174/135 |
| 5,740,997 A | * | 4/1998 | Van Wieran | A47C 3/30 248/161 |

\* cited by examiner

*Primary Examiner* — Christopher Schwartz
(74) *Attorney, Agent, or Firm* — Cozen O'Connor

(57) ABSTRACT

A retention clip having a body with a first end and a second end opposite the first end; a mounting hole defined in the first end of the body; and a U-shaped retaining slot formed by a leg arranged at the second end of the body and a portion of the body between the mounting hole and the U-shaped slot. The leg arranged at the second end of the body extends substantially perpendicular to a longitudinal axis of the body.

20 Claims, 3 Drawing Sheets

CABLE RETENTION CLIP

FIELD OF THE INVENTION

This is invention describes a cable retention clip. More particularly to a cable retention clip that provides mechanical retention for the cable housing to release head interface.

DESCRIPTION OF THE RELATED ART

Release cables are used in many different applications. One use for release cables is to actuate gas springs. Gas springs are used for backrest and armrest adjustment in swivel chairs, table height adjustment, head and foot panel adjustment in treatment tables and beds, and the like.

Release valves for gas springs are typically operated by levers or a release cable coupled to a lever or a switch. Bowden cable configurations and release heads provide design flexibility and variability in positioning the gas spring in a given application.

A Bowden cable release is typically used when the release mechanism cannot be installed directly on the gas spring. This system consists of a release head, a Bowden cable with optional lengths, and a release unit.

To prevent the Bowden cable from disengaging from the release head, cable ties are typically used to hold the cable to a rod. However, in operation, the cable ties can get caught in the mechanism and the cable ties fail over time.

SUMMARY OF THE INVENTION

One issue when using a Bowden cable configuration is the release cable becomes disengaged from the release head. A cable retention clip in accordance with the present disclosure prevents the release cable from becoming disengaged from the release head.

According to one embodiment, the cable retention clip prevents the cable housing from becoming detached from the mating release head. The clip has an oblong hole that installs over the gas spring rod and is contained between the release head and a locking jam nut. The oblong hole provides lateral adjustment with the gas spring rod. The lateral adjustment allows the clip to be adjusting for various cable housing diameters.

According to one embodiment, the retention clip comprises a body having a first end and a second end opposite the first end; a mounting hole defined in the first end of the body; and a U-shaped retaining slot formed by a leg arranged at the second end of the body and a portion of the body between the mounting hole and the U-shaped slot. The leg arranged at the second end of the body extends substantially perpendicular to a longitudinal axis of the body.

According to one embodiment, the mounting hole is oval.

According to one embodiment, the leg of the retaining portion arranged at the second end of the body is shorter than a lateral dimension of the clip.

According to one embodiment, the portion of the body between the mounting hole and the U-shaped slot clip has a tapered portion leading into the U-shaped cutout, preferably the taper is about 8 degrees.

According to one embodiment, a gas spring assembly comprises a gas cylinder having a shaft moveably extending from a longitudinal end of the gas cylinder; a release assembly coupled to an end of the shaft opposite the gas cylinder, the release assembly comprising a release head; and a release mechanism; a jam nut arranged on the shaft and configured to adjust bias the release assembly; a cable assemble comprising: a cable coupled to the release lever; and a protective sheath; and a retention clip arranged between the release head and the jam nut, the retention clip comprising: a mounting portion defining a hole configured to mate with the shaft; and a retention slot configured to receive the protective sheath of the cable assembly. The cable sheath is clamped in place by the retention clip.

According to one embodiment, a method of retaining a cable using a retention clip having a body having a first end and a second end opposite the first end; a mounting hole defined in the first end of the body; and a U-shaped retaining slot formed by a leg arranged at the second end of the body and a portion of the body between the mounting hole and the U-shaped slot, wherein the leg arranged at the second end of the body extends substantially perpendicular to a longitudinal axis of the body comprises mounting the retention clip via the mounting hole; inserting a cable into the U-shaped slot so that a cable sheathing is within the U-shaped slot; moving the retention clip longitudinally to clamp the cable sheathing; and adjusting a retaining element configured to lock the retention clip in place.

According to one embodiment, the retention clip is mounted on a shaft.

According to one embodiment, the retaining element is a screw element, preferably a nut.

DETAILED DESCRIPTION OF THE FIGURES

The disclosed retention clip provides mechanical retention for a cable. In the embodiment disclosed, the retention clip is used to retain a cable at a release head. The release head is used to adjust the gas cylinder. The cable is a push/pull cable. In a preferred embodiment, the retention clip is adjustable on the gas spring rod for different cable housing diameters. Because the retention clip is mounted to the gas spring, the release cable can be serviced or replaced without having to remove the cable retention clip from the gas spring. The retention clip can be mounted to the gas spring using auto thread-on equipment.

The retention clip is of compact design so it can be used in confined spaces. Preferably, the retention clip is produced from corrosion resistant material. In one embodiment, the retention clip is 6061 aluminum. The aluminum retention clip is anodized, powder coated, and the like. Alternatively, the retention clip is plastic, stainless steel, steel, or the like. The retention clip can be stamped, molded, lasered, machined, or the like.

Figure 1:
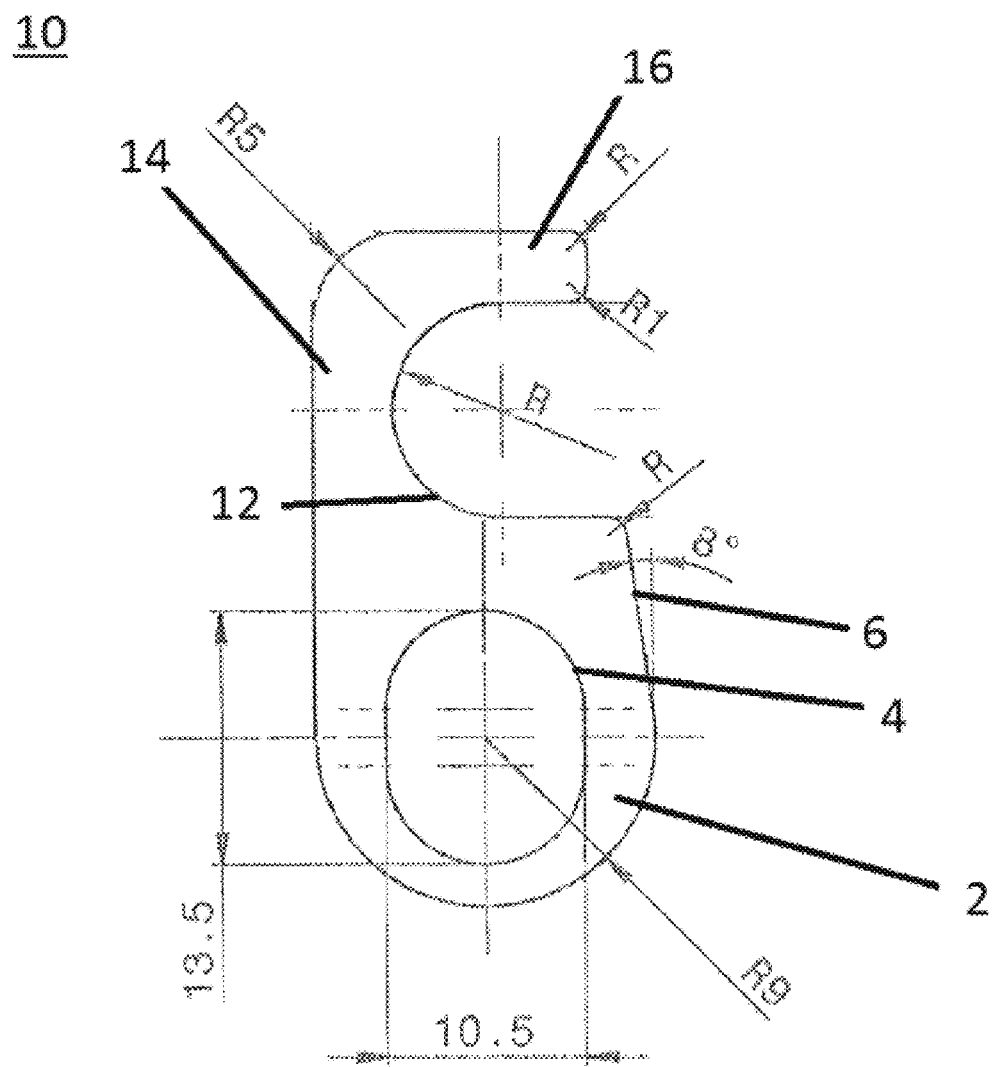
FIG. 1 is a top view of a retainer clip.

The cable retention clip 10 shown in FIG. 1 prevents a release cable from becoming disengaged from the release head. The cable retention clips provides a positive stop to prevent a release cable from becoming loose from a release head.

The cable retention clip 10 has a mounting portion 2 and a cable capture portion 12. The cable retention clip 10 is typically 2 mm (0.078 inches) thick. It should be noted that the size of the mounting portion 2 and a cable capture portion 12 is dependent on at least the cable being retained.

The dimensions shown in FIG. 1 are for a given embodiment. Other dimensions can be used to meet a specific need.

The mounting portion 2 is an oval cutout 4 configured to mate with a shaft of a gas cylinder. However, other mounting applications of the retention clip 10 are envisioned such as a mounting screw, bolt, or the like. In one embodiment, the oval cutout can be a U-shaped slot that is open at an end of the retention clip 10. The oval cutout 4 of the mounting portion 2 is configured to adjust laterally by sliding the retention clip 10 on the shaft to vary a distance of the retaining portion to the shaft. In a preferred embodiment, the oval cutout 4 is 10.5 mm (0.41 inches) wide and 13.5 mm (0.53 inches) long. The oval slot allows for adjusting the retention clip to adjust for different size cables. In one embodiment, a center of the cable capture portion 12 is laterally offset from the longitudinal axis of the oval cutout 4.

The cable capture portion 12 has a U-shaped cutout 14. A radius of the U-shaped cutout is matched to the cable to be retained. The radius of the u-shaped cutout 14 is about the diameter of the cable to be retained or larger. If the u-shaped cutout 14 has a radius significantly smaller than the diameter of the cable, the cable can be damaged. The outer leg 16 of the retaining portion 12 is shorter than a lateral dimension of the clip. Alternatively, the outer leg 16 is longer than a lateral dimension of the clip. The outer leg 16 extends perpendicular to a longitudinal axis of the retention clip 10. It should be noted that the leg can extend at other angles, +/- about 45°, preferably +/- about 15°, depending on the application. The outer leg 16 must be capable of retaining the cable in its clamped position. In one embodiment, the outer leg 16 is bent after installation to further retain the cable. Additionally, the clip has a tapered portion 6 leading into the U-shaped cutout 14. Preferably, the taper is about 8 degrees.

Figure 2:
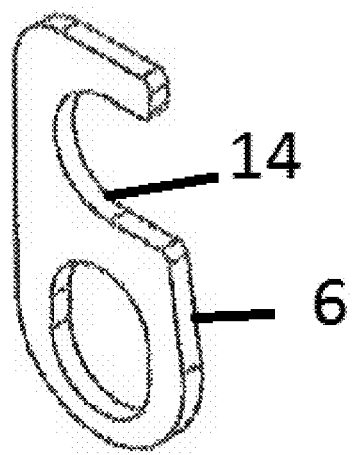
FIG. 2 is a perspective view of the retainer clip.

FIG. 2 is a perspective view of the retention clip 10. As shown, the taper 6 assists in inserting a cable to be retained in the U-shaped cutout 14.

Figure 3:
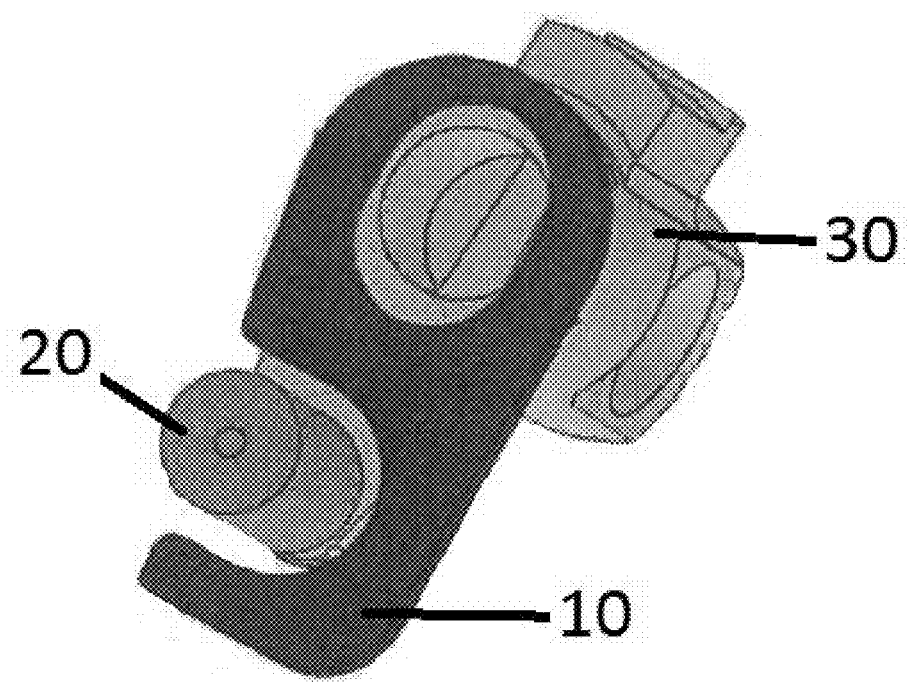
FIG. 3 is a perspective view of the retainer clip in an installed condition.

FIG. 3 is a schematic perspective view of the retention clip 10 in an installed condition. As shown, the retention clip 10 is mounted on an assembly 30. A shaft 102 of the assembly 30, not shown, passes through the oval cutout 4. The oval cutout 4 is dimensioned so that it can move longitudinally to capture and retain the cable assembly 20. The cable assembly 20 has a cable and a protective sheath. The cable assembly 20 is retained by the retention clip 10 via the protective sheath so that the cable is not damaged. It should be noted that the retention clip 10 can rotate about the shaft 102 of the assembly 30 to easily capture the cable 20 in the U-shaped cutout 14.

Figure 4:
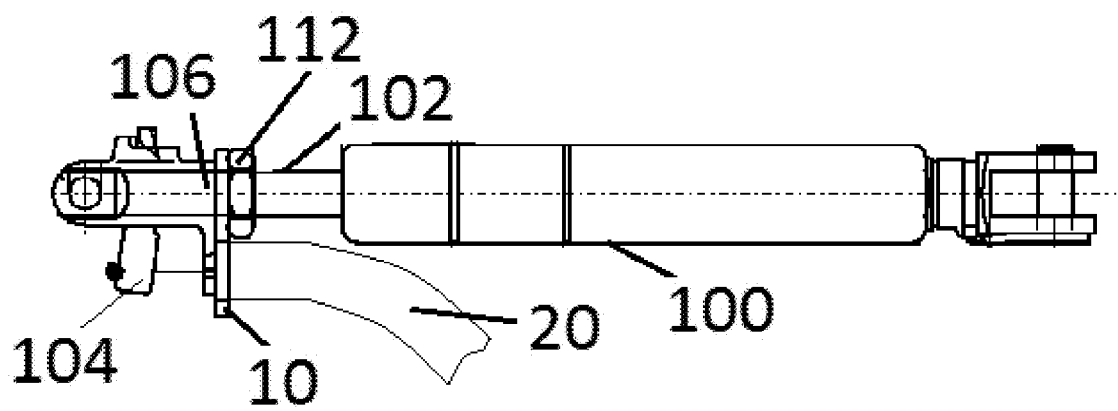
FIG. 4 is a gas spring assembly.

FIG. 4 is a gas spring assembly. Shown is a gas cylinder 100 with a shaft 102. A release assembly is affixed to an end of the shaft 102 opposite the cylinder 100. The release assembly includes a release lever 104 and a die cast release head 106. The retention clip 10 is retained between die cast release head 106 of the release and a retaining nut 112, commonly referred to as a jam nut. The cable 20 is shown schematically. The cable sheath is clamped in place by the retention clip 10.

Figure 5:
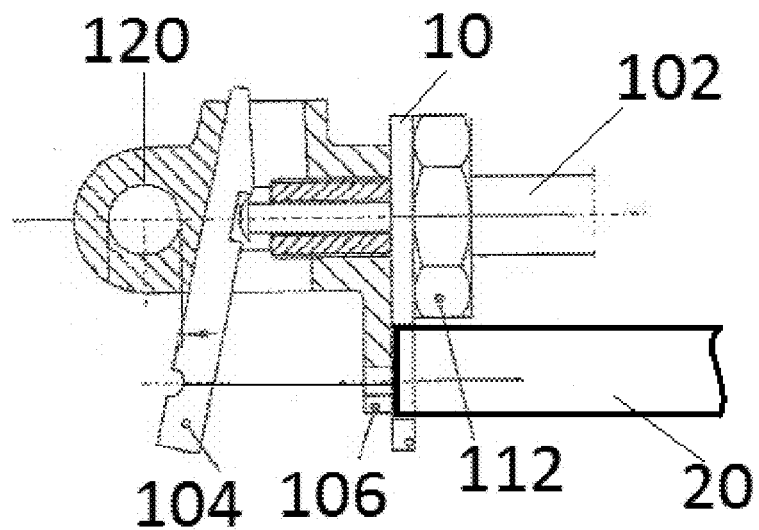
FIG. 5 is a partial cross section of the release valve for the gas spring of FIG. 4.

FIG. 5 is a partial cross section of the release valve for the gas spring of FIG. 4. The release assembly is affixed to an end of the shaft 102. The release includes a housing with a die cast release head 106. The retention clip 10 is arranged between the die cast release head 106 and a retaining nut 112. A mounting eye 120 is provided at an end of the shaft 102.

The cable sheath of cable assembly 20 passes through the die cast release head 106. The sheath of the cable is arranged in the U-shaped portion 14. The retention clip 10 is moved longitudinally to clamp the sheath between the outer leg 16 of the retaining portion 12 and the die cast release head 106. By clamping the sheath in place the cable assembly 20 is prevented from moving and the cable 20 is prevented from becoming disengaged from the release head. The cable is affixed to the lever 104 in a groove in the lever 104. The cable 20 can be adjusted using the retaining nut 112. Alternatively, the retention clip 10 is rotated to retain the cable in the u-shaped portion 14 by pressing the opening of the U-shape against a solid body.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A retention clip comprising:
   a substantially planar body having a first longitudinal end and a second longitudinal end opposite the first end;
   a mounting hole defined in the first end of the body, walls of the mounting hole being perpendicular to a longitudinal extent of the substantially planar body; and
   a retaining portion comprising U-shaped retaining slot formed by a leg arranged at the second end of the body and a portion of the body between the mounting hole and the U-shaped retaining slot, a longitudinal extent of a pair of parallel walls forming a portion of the U-shaped retaining slot being perpendicular to a longitudinal axis of the substantially planar body and the walls of the mounting hole,
   wherein the leg arranged at the second end of the body extends substantially perpendicular to the longitudinal axis of the body.

2. The retention clip of claim 1, wherein the mounting hole is oval.

3. The retention clip of claim 1, wherein the leg of the retaining portion arranged at the second end of the body is shorter than a lateral dimension of the retention clip.

4. The retention clip of claim 1, wherein the leg of the retaining portion arranged at the second end of the body is longer than a lateral dimension of the retention clip.

5. The retention clip of claim 1, wherein the portion of the body between the mounting hole and the U-shaped slot clip has a tapered portion leading into the U-shaped cutout.

6. The retention clip of claim 5, wherein the taper is about 8 degrees.

7. The retention clip of claim 1, wherein the retention clip comprises one of plastic and metal.

8. A gas spring assembly comprising:
   a gas cylinder having a shaft moveably extending from a longitudinal end of the gas cylinder;
   a release assembly coupled to an end of the shaft opposite the gas cylinder, the release assembly comprising:

a release head; and
a release mechanism;
a jam nut arranged on the shaft and configured to adjust bias the release assembly;
a cable assembly comprising:
a cable coupled to the release mechanism; and
a protective sheath; and
a retention clip arranged between the release head and the jam nut, the retention clip comprising:
a mounting portion defining a hole configured to mate with the shaft; and
a retention slot configured to receive the protective sheath of the cable assembly,
wherein the protective sheath is clamped in place by the retention clip.

9. The gas spring assembly of claim 8, wherein the hole configured to mate with the shaft is oblong.

10. The gas spring assembly of claim 9, wherein the retention clip is configured to be adjusted longitudinally to clamp the protective sheath.

11. The gas spring assembly of claim 8, wherein the portion of the body between the mounting hole and the U-shaped slot clip has a tapered portion leading into the U-shaped cutout.

12. The gas spring assembly of claim 11, wherein the taper is about 8 degrees.

13. The gas spring assembly of claim 8, wherein the retention slot is U-shaped.

14. The gas spring assembly of claim 8, wherein the release mechanism is a lever.

15. The gas spring assembly of claim 8, wherein the leg of the retaining portion arranged at the second end of the body is one of shorter than a lateral dimension of the retention clip and longer than a lateral dimension of the retention clip.

16. The gas spring assembly of claim 8, wherein the retention clip comprises one of plastic and metal.

17. A method of retaining a cable using a substantially planar body having a first longitudinal end and a second longitudinal end opposite the first end; a mounting hole defined in the first end of the body, walls of the mounting hole being perpendicular to a longitudinal extent of the substantially planar body; and a retaining portion comprising U-shaped retaining slot formed by a leg arranged at the second end of the body and a portion of the body between the mounting hole and the U-shaped retaining slot, a longitudinal extent of a pair of parallel walls forming a portion of the U-shaped retaining slot being perpendicular to a longitudinal axis of the substantially planar body and the walls of the mounting hole, wherein the leg arranged at the second end of the body extends substantially perpendicular to the longitudinal axis of the body, comprising:
mounting the retention clip via the mounting hole;
inserting a cable into the U-shaped retaining slot so that a cable sheathing is within the U-shaped retaining slot;
moving the retention clip longitudinally to clamp the cable sheathing; and
adjusting a retaining element configured to lock the retention clip in place.

18. The method of claim 17, wherein the retaining element is a screw element.

19. The method of claim 18, wherein the screw element is a nut.

20. The method of claim 17, wherein the retention clip is mounted on a shaft.

* * * * *